United States Patent [19]

Watanabe et al.

[11] Patent Number: 5,285,373
[45] Date of Patent: Feb. 8, 1994

[54] APPARATUS FOR CONTROLLING THE OPENING AND CLOSING OF A WORK CLAMPING MECHANISM IN A NUMERICALLY CONTROLLED MACHINE TOOL

[75] Inventors: Chikara Watanabe; Masaaki Mituzono; Hiroshi Ira, all of Numazu, Japan

[73] Assignee: Toshiba Kikai Kabushiki Kaisha, Tokyo, Japan

[21] Appl. No.: 796,801

[22] Filed: Nov. 25, 1991

[30] Foreign Application Priority Data

Nov. 26, 1990 [JP] Japan .................................. 2-323907

[51] Int. Cl.⁵ .............................................. G05B 11/01
[52] U.S. Cl. .................................. 364/140; 364/474.02; 364/474.09; 364/474.3; 83/13
[58] Field of Search .............. 364/140, 474.02, 474.09, 364/474.11, 474.3, 468, 474.16; 269/58; 83/13, 451, 452; 29/33 R, 33.2

[56] References Cited

U.S. PATENT DOCUMENTS

| | | | |
|---|---|---|---|
| 4,471,676 | 9/1984 | Mason | 364/474.2 X |
| 4,523,749 | 6/1985 | Kindgren et al. | 269/58 X |
| 4,651,601 | 3/1987 | Sasaki | 364/474.2 X |
| 4,866,630 | 9/1989 | Beaman et al. | 364/474.02 |
| 5,161,289 | 11/1992 | Adams et al. | 364/474.2 X |

Primary Examiner—Jerry Smith
Assistant Examiner—Brian C. Oakes
Attorney, Agent, or Firm—Cushman, Darby & Cushman

[57] ABSTRACT

An apparatus for controlling the opening/closing of a mechanism for clamping a work machined by a numerically controlled machine tool, comprising a driver for the clamping mechanism. The apparatus controls the opening/closing of the clamping mechanism on the basis of measured data on the distance of a main shaft provided in the machine body from the origin position of the machine, measured data on the moving speed of the main shaft, coordinate values of a clamp pawl of the clamping mechanism and data on a region where the clamping mechanism is opened.

14 Claims, 6 Drawing Sheets

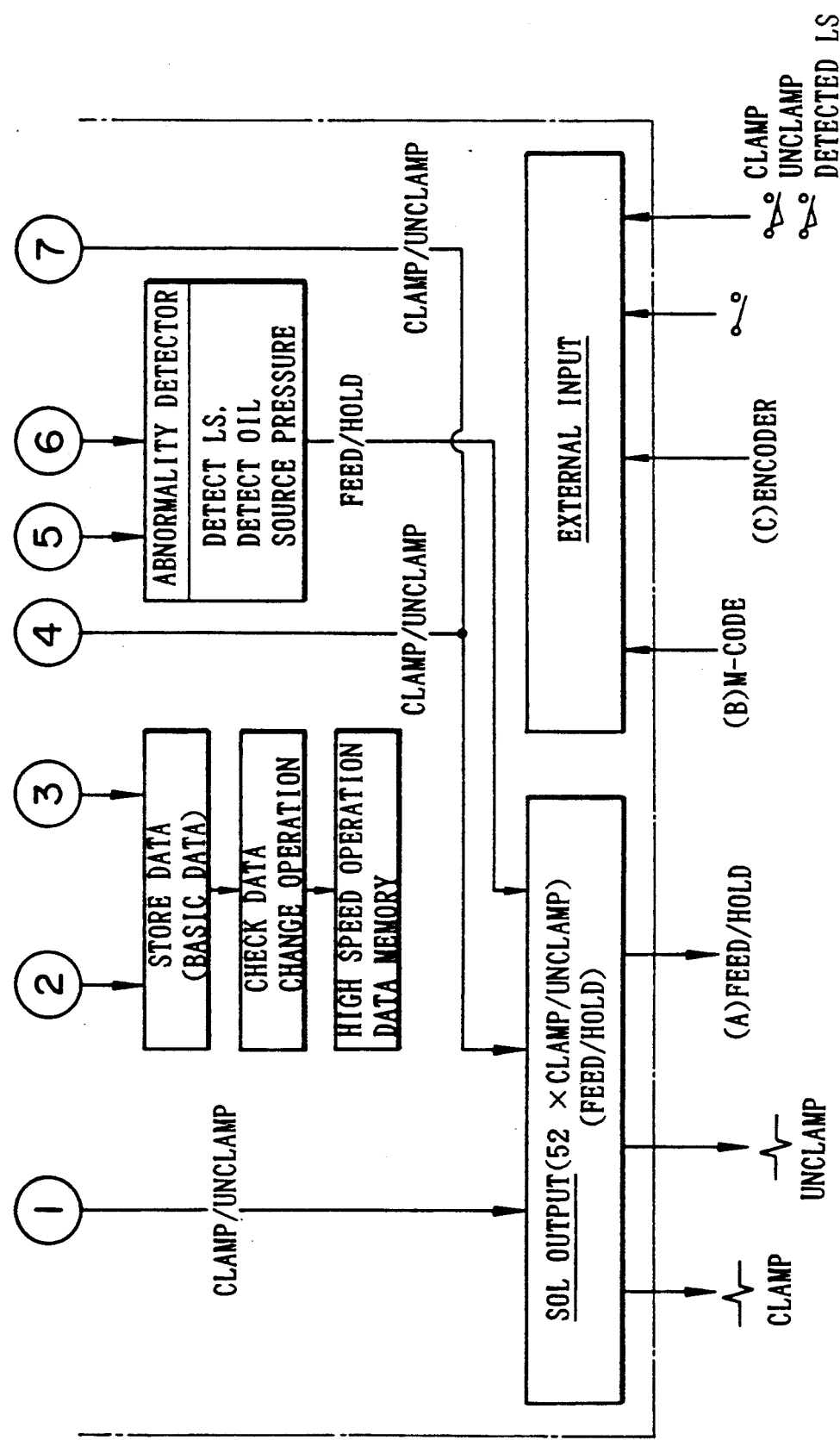

APPARATUS FOR CONTROLLING THE OPENING AND CLOSING OF A WORK CLAMPING MECHANISM IN A NUMERICALLY CONTROLLED MACHINE TOOL

BACKGROUND OF THE INVENTION

1. Field of the Invention

The present invention relates to apparatus for controlling the automatic opening and closing of a work clamping mechanism in conjunction with a tool post in a machine tool which processes potentially elongated workpieces, and may be used in profilers, horizontal boring machines, etc.

2. Description of the Related Art

Many workpieces machined in a profiler to provide parts of an airplane, etc., are made of a soft material such as an aluminum alloy. They are often made of a long rectangular material by grinding. Generally, many successively disposed clamping devices are used to clamp a workpiece.

In order to attach the workpiece using these clamping devices, the operator sets a plurality of clamping devices on a table to clamp the work.

When the workpiece thus clamped is machined, a tool is fed to machine the workpiece except at the clamped portions of the work. Then, the clamping positions are changed and those portions of the workpiece which are not subjected to machining are then machined.

Since the process in which a workpiece is temporarily clamped and machined and then the clamping positions are changed and the workpiece is again machined provides a low machining efficiency, the following process is employed in an effort to improve the machining efficiency. A plurality of identical workpieces which are clamped at different positions are prepared. Each time machining one of the workpieces is completed, another work set on a new jig is machined while the next preparation is being made.

When the first machining of all the workpieces is completed, the clamping positions are changed and the next scheduled workpiece is then machined. Thus, the availability of the machine tool itself and hence the machining efficiency are improved.

However, attaching a workpiece using conventional clamping devices consumes much time and labor into preparation because individual clamps must clamp the workpiece. In addition, the operator is required to attach a workpiece by tightening many clamps manually, so that the clamping forces can vary from one to another. If the workpiece is made of a thin soft aluminum alloy, the accuracy of finish may be adversely affected by the material of the work.

Machining is made on the workpiece except at the clamped portions of the work, so that the machining speed and hence the machining efficiency are undesirably low.

After machining all but the clamped portions, the clamping positions must be changed and the workpiece remachined. Therefore, the arrangements are troublesome. It is difficult to have a highly accurate finish for the machined portions of the workpiece.

The process is which a plurality of workpieces clamped similarly, are prepared and, when machining all the workpieces is completed, the clamping positions are changed and the next workpieces are machined requires a lot of preparation and the use of many clamps. Therefore, managing the clamps is troublesome and a reduction in the machining accuracy due to changing the clamping positions is not solved.

It is an object of the present invention to provide an apparatus for controlling the opening and closing of a workpiece clamping mechanism in a numerically controlled tool machine which reduces the amount of preparation required for a workpiece and hence improves the machining accuracy.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

SUMMARY OF THE INVENTION

According to the present invention, an apparatus for controlling the opening and closing of a workpiece clamping mechanism in a numerically controlled machine tool, is provided. The apparatus includes a base structure and a plurality of clamping mechanisms on the base structure. The apparatus also includes a device for opening and closing the clamping mechanisms. The apparatus includes an operating element movable along the base structure in a first direction. A device for detecting the position of the operating element from the origin of the machine is included in the apparatus. A device for detecting the moving speed of the operating element and a device for inputting to the apparatus the position of the operating element, the moving speed of the operating element, the position of each of the clamping mechanisms and the unclamped interval for each of the clamping mechanisms are also included in the apparatus.

Finally, a device for controlling the opening and closing of the clamping mechanism such that each clamping mechanism is opened when the position of the operating element is within the unclamped interval and is closed when the position of the operating element is outside of the unclamped interval is included in the apparatus.

The controlling device in the apparatus may be a sequencer or a microcomputer. The position detecting device and the speed detecting device may share a single absolute pulse encoder. The driving device for the clamping mechanism is preferably a hydraulic or an air cylinder.

The position of the moving of the operating element, such as a main shaft of a machine body is transmitted to the sequencer at all times by the position detecting device and the speed detecting device provided between the main shaft and the table which move relative to each other.

The clamping mechanism is automatically and sequentially opened and closed in conjunction with the movement of the main shaft in accordance with a command from the sequencer. Therefore, the respective clamping mechanisms provided at the position where the main shaft has arrived at are opened, so that the workpiece is continuously machined by a tool attached to the main shaft.

BRIEF DESCRIPTION OF THE DRAWINGS

FIG. 6(A) and FIG. 6(B) show the internal details of a sequencer.

DETAILED DESCRIPTION OF THE PREFERRED EMBODIMENT(S)

One embodiment of the present invention will be described with reference to the drawings.

Figure 1:
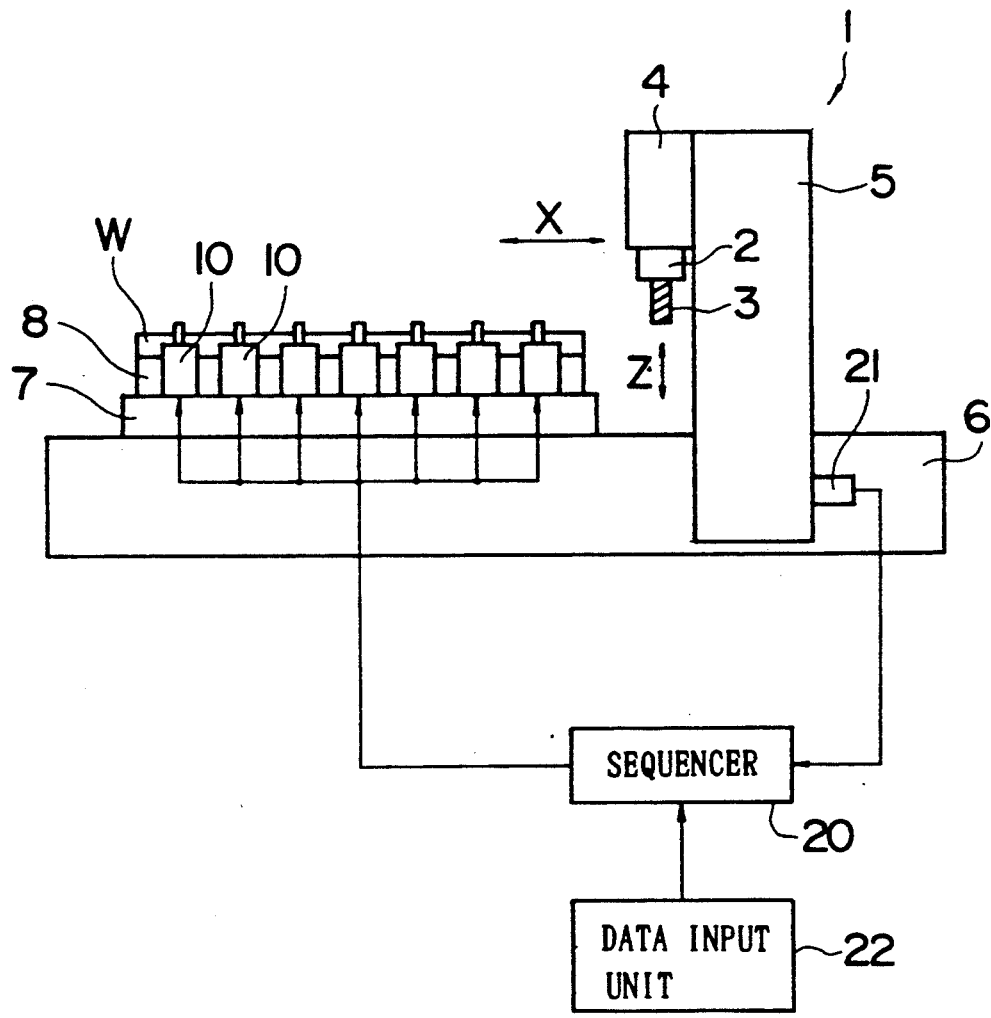
FIG. 1 is a schematic of the entire embodiment of an apparatus for controlling the opening and closing of a workpiece clamping mechanism in a numerically controlled machine tool according to the present invention.

FIG. 1 is a schematic of the entire apparatus for controlling the opening and closing of a workpiece clamping machine in a numerically controlled machine tool according to the present invention.

A machine tool in which the apparatus is used is a profiler in the present embodiment.

A tool post 4 to which a tool 3 is attached through a main shaft 2 is mounted on a machine body 5, which takes the form of a gate, for example, riding on table 6.

Pinions (not shown) are rotated by a motor (also not shown) provided below either leg of the gate. A pair of racks (not shown), each provided laterally of table 6, meshes with the corresponding pinions. The machine body 5 moves freely horizontally (in the X-axis direction) relative to table 6 on the basis of the meshing of the racks and pinions, and the rotation of the pinions by the motor. The tool post 4 moves vertically (in the Z-axis direction) relative to the table 6.

Profiler 1 comprises various control units, a cutting lubricant feed unit, and an ATC unit (not shown).

In profiler 1, main shaft 2 and tool 3 are rotated while tool post 4 is being fed in the X- and Z-axis directions to machine an airplane part. The part is typically made of a light alloy such as an aluminum alloy.

Workpiece is put on table 6 through a base structure 7 comprising a work attaching jig and a locator block 8 and fixed by many clamping mechanisms 10.

Figure 2:
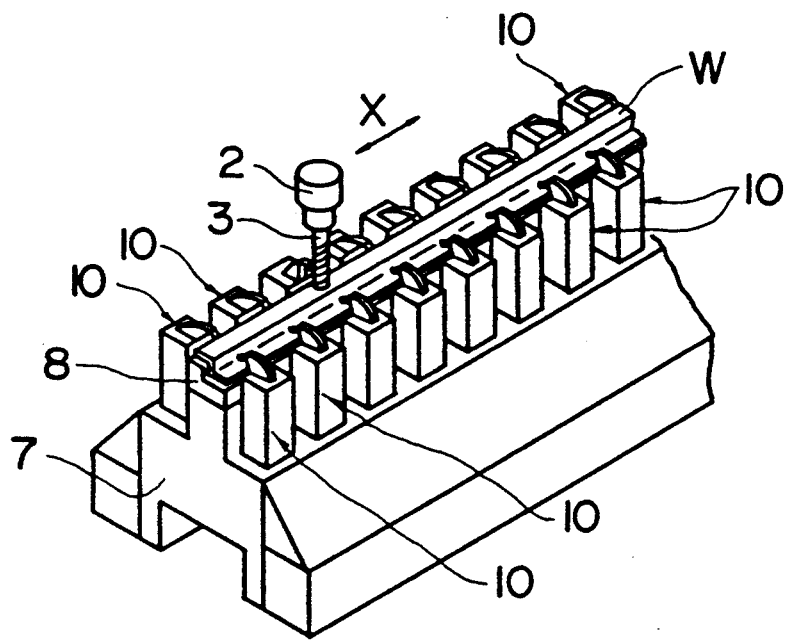
FIG. 2 is a partial perspective view of the apparatus.
Figure 5:
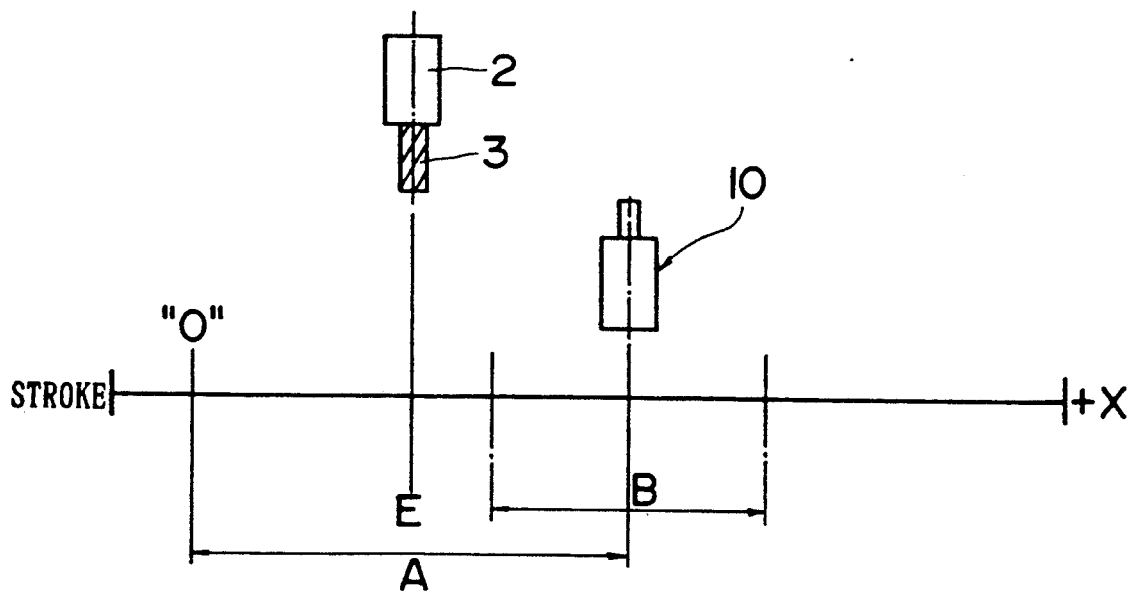
FIG. 5 illustrates the principles of operation of the clamping mechanism.
Figure 3:
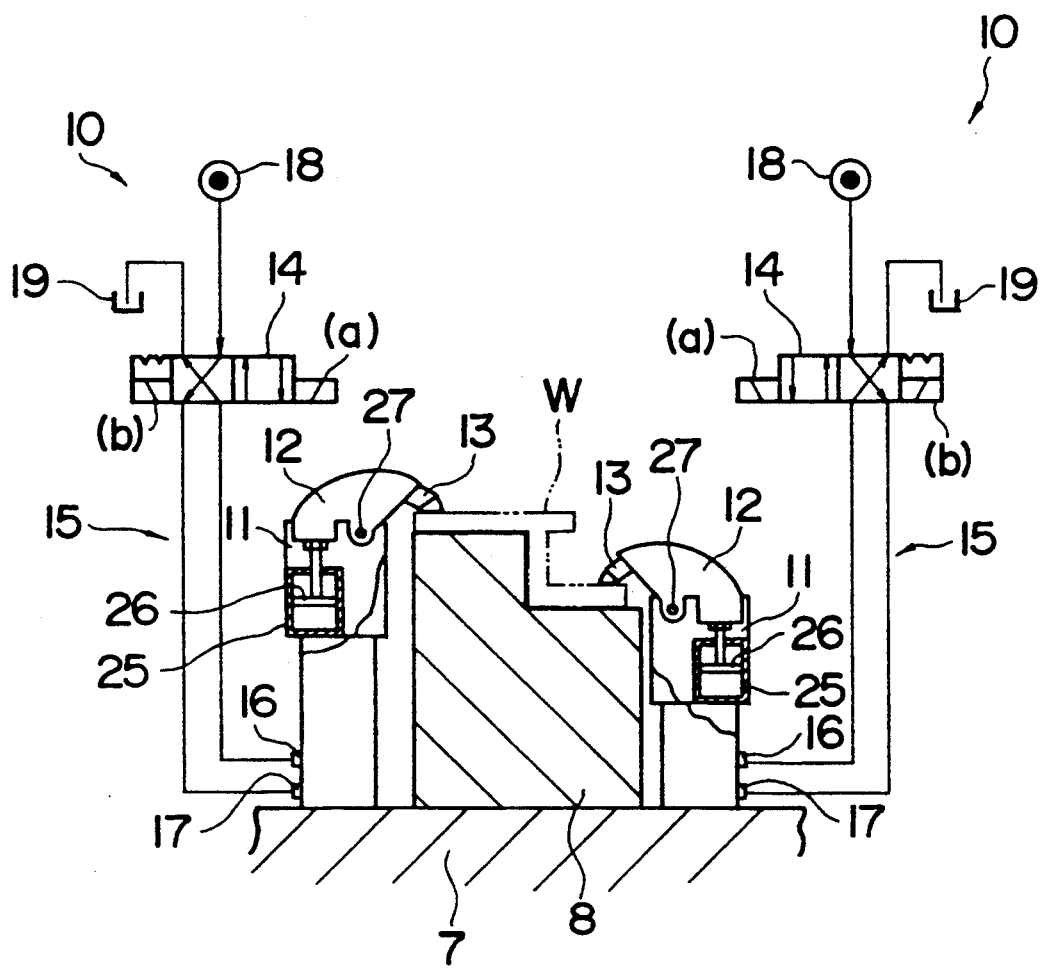
FIG. 3 shows a clamped state of a workpiece by the clamp mechanism.
Figure 4:
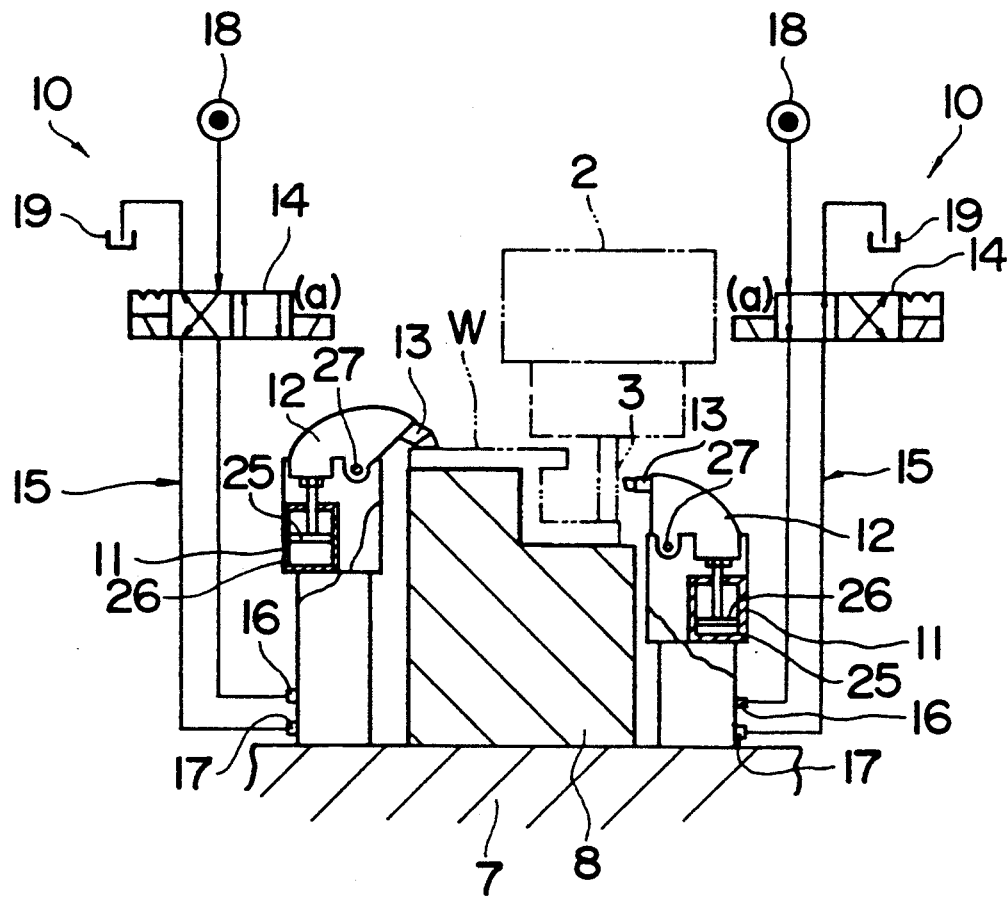
FIG. 4 shows an unclamped state of the workpiece.

As shown in FIGS. 2–4, in the present embodiment, workpiece W takes substantially the form of a crank in cross section.

Clamping mechanisms 10 each clamp workpiece W at both sides at relatively short intervals.

The clamping mechanisms 10 are disposed in two rows facing each other in symmetrical relationship as shown in FIGS. 2–4. Each clamping mechanism 10 includes a body 11, a clamp arm 12, a clamper 13, and a hydraulic circuit 15 which includes an electromagnetic changeover valve 14.

Hydraulic circuit 15 is connected to body 11 through oil feed ports 16, 17 to feed a hydraulic oil from an oil source 18 to body 11. Electromagnetic 4-port 2-position changeover valve 14, operated by a pair of solenoids (a)(b), is provided in the middle portion of each circuit 15. a reservoir 19 receives returning oil.

Body 11 has a built-in cylinder 25 which is connected to the hydraulic circuit 15. A cylinder piston 26 is connected to a clamp arm 12, which is connected pivotally at a lower end with a support 27 attached to body 11. When the clamping mechanism 10 is fed with hydraulic oil through port 17, the clamp arm 12 is swung around support shaft 27 due to the lifting of piston 26 in a direction in which workpiece W is clamped. When the clamping mechanism is fed with oil through the other port 16, the clamp arm 12 is swung around support shaft 27 due to the lowering of piston 26 in the direction in which workpiece W is unclamped.

A driving device for the clamping mechanism 10 comprises a hydraulic circuit 15 connected to an oil source 18, the cylinder chamber, and the piston 26.

Right and left bodies 11 are different in height so as to conform to the shape of workpiece W, but are similar in structure and operation. Accordingly, a description of any one of the remaining bodies 11 is included for brevity.

Clamper 13 is provided at an end of clamp arm 12 to press workpiece W.

An absolute pulse encoder 21 is provided on the motor which rotates the pinions below the machine body 5, (See FIG. 1). The pulse encoder 21 detects as an absolute value the position of an operating element of the moving machine body 5 and more particularly the position of the main shaft 2 which has moved along the X axis from the origin of the machine. The pulse encoder 21 also detects the feed speed of machine body 5 simultaneously.

More specifically, the pulse encoder 21 is attached to one rotational shaft of the motor (not shown) provided below the gate type machine body 5 to detect the position and speed of the machine body 5 and hence tool post 4 on the X axis as the motor rotates.

Figure 6A:
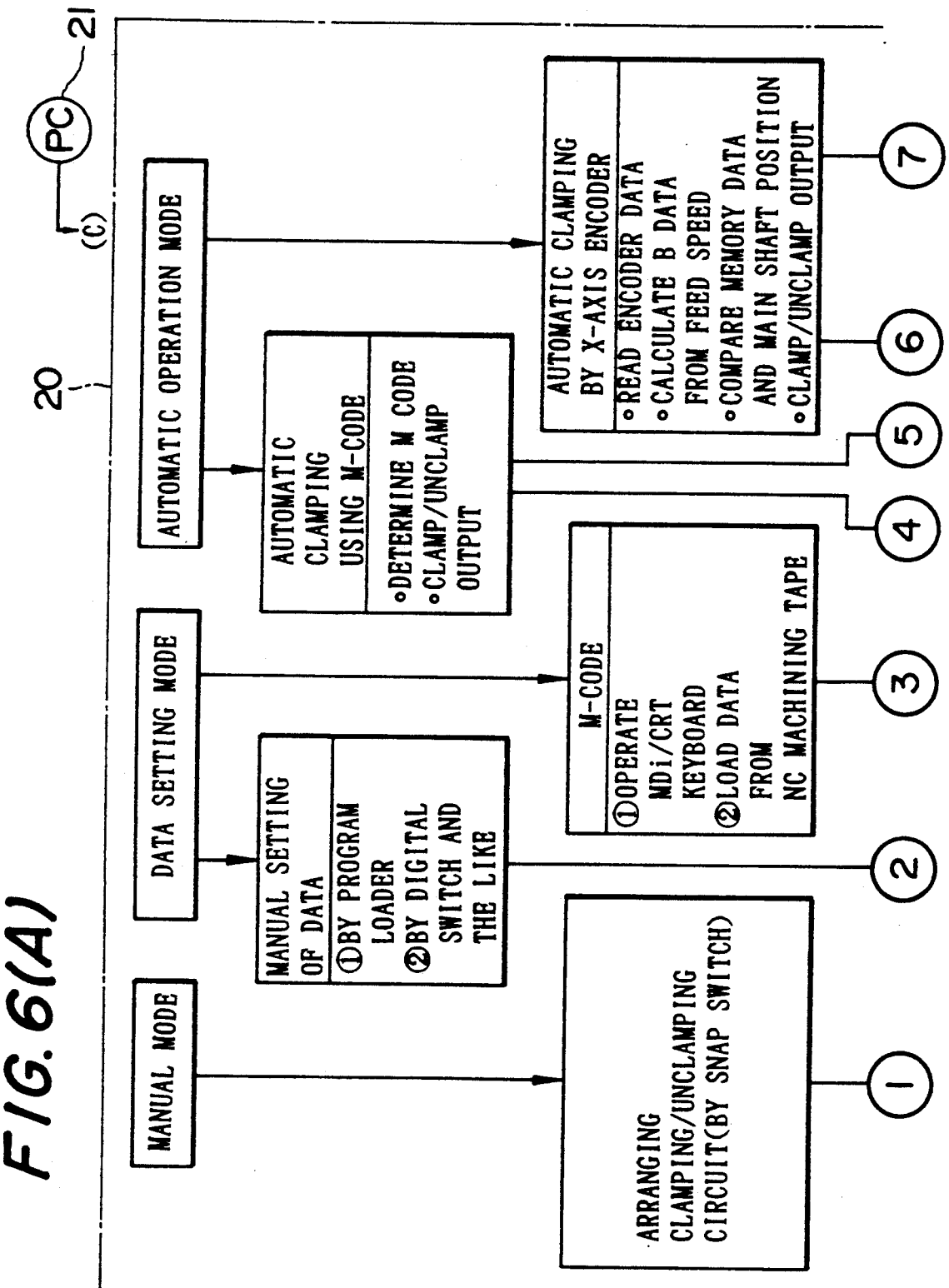

Provided in the vicinity of table 6 is a sequencer 20, which compares data on the position and speed fed by the pulse encoder 21 with data beforehand set by data input unit 22 and outputs a command to clamp mechanism 10 to thereby drive the driver for each of the clamping mechanisms 10. FIG. 6(A) and FIG. 6(B) show the internal details of the various functions of sequencer 20.

The operation of the present invention will be described with reference to FIGS. 1–5. First, the principles of the apparatus according to the present invention will be described with reference to FIG. 5.

The distance from a preset origin position "0" of the machine to a predetermined position of a clamping mechanism 10 is set as data A. In this case, the central position of the clamping mechanism 10 is set as a reference.

For clamping mechanism 10, data B is set which indicates an unclamped interval or zone having a width B. The unclamped interval is determined by the position and speed of the main shaft 2 and contains the position of the clamping mechanism 10 at the center of the zone.

Data A and B are input beforehand through a data input unit 22 to a sequencer 20 and stored by the same. The character E denotes data on the position of the main shaft 2 on the X-axis input from pulse encoder 21 to sequencer 20.

When the tool 3, attached to main shaft 2, moves on the X axis (data E on the position of the main shaft, that is, data on the detected main shaft position is delivered from the X-axis encoder to the sequencer 20) to enter an unclamped zone B, the clamping mechanism 10 is unclamped at an appropriate position.

The operation of the present invention based on such principles, will be described with reference to FIGS. 3 and 4.

Workpiece W is clamped at either side by many clamping mechanisms 10. A workpiece having a shape shown in the present embodiment, is machined at one side. In this case, the clamping mechanisms which clamp the other side of the work are controlled by a NC control mechanism such that they are not driven.

For convenience of explanation, assume that the right side of workpiece A is machined in FIGS. 2-4.

When workpiece W is placed on the table 6, the machining starts. When be machine body 5 or tool post 4, main shaft 2, etc., move in the X-axis direction on table 6, while machining a surface of workpiece W, absolute pulse encoder 21 feeds data on the position and speed of tool 3 at all times to the sequencer 21.

The main shaft 2 moves further in the X-axis. To determine if the position of the main shaft 2 is within unclamped zone B is determined from the data on the position E and the speed of main shaft 2. When the and main shaft 2 enters unclamped zone B (data B) [E≧(A−B/2)], sequencer 20 gives a command to the electromagnetic changeover valve 14 to energize solenoid (a). As a result, hydraulic oil is fed from one oil feed port 16 to cylinder 25 to thereby push down piston 26. Thus, the clamp arm 12 is swung around support shaft 27 to thereby release the clamp (See FIG. 4).

The surface portions of workpiece W from which the clamps are released are machined by tool 3 subsequent to the machining of the unclamped portions.

When tool 3 which has machined the unclamped portions of the work has passed through unclamped zone B of the first clamping mechanism 10 [E>-(A+B/2)], data on the movement and data on the speed of main shaft 2 are delivered to sequencer 20. In response to this data, sequencer 20 give a command to changeover valve 14 to energize solenoid (b). As a result, oil is fed from the other oil feed port 17 to cylinder 25 to thereby push up piston 26. Thus, the clamp arm 12 is swung around support shaft 27. As a result, the clamper 13 clamps the workpiece (See FIG. 3).

Thereafter, the main shaft 2, advances further while continuing machine by tool 3 until tool 3 comes close to the next clamping mechanism 10. At this time the next clamping mechanism 10 is repeatedly opened/closed by an operation similar to that mentioned above. Also, in this case, the machining continues.

According to the above embodiment, the following advantages are produced.

Since workpiece W is automatically clamped by clamping mechanism 10, which is opened and closed in accordance with a command from sequencer 20, the clamping arrangements are greatly improved. Once workpiece W is arranged, machining the entire surface of the workpiece is achieved without making any further clamping arrangements. Therefore, frequent clamping arrangements which were required to be made in the past, are rendered useless. Thereby, the present invention greatly improves the clamping arrangements. A minimum required number of clamping mechanisms 10 will suffice for one workpiece W to thereby facilitate the management of the clamping mechanisms 10.

Since clamping mechanisms 10 are operated by hydraulic oil, equal and uniform clamping forces are applied even when many clamping mechanisms 10 are used. Therefore, even a soft thin workpiece will not suffer from a finish having a low machining accuracy which would otherwise occur from uneven clamping forces.

As tool post 4, moves and tool 3 comes close to a clamping mechanism 10, the clamping mechanism 10 closest to the tool 3 is unclamped and machining continues. Therefore, no machining which avoids the clamped portions is required. No reduction of the machining speed is required, so that a high accuracy, smooth machined surface is obtained and the machining efficiency is improved.

The present invention is not limited to the above embodiment and may include the following modifications.

While in the above embodiment the device for detecting the position of the moving tool post 4 is illustrated as using an absolute pulse encoder 21, it is not limited to such a pulse encoder. For example, a magnetic scale or an optical scale may be provided on the side of table 6 and a read head may be provided on the moving tool post 4 side, such that both cooperate to detect the position of the moving tool post 4 and the read head outputs the data on the detected position to sequencer 20.

In place of an absolute pulse encoder 21, the position of the moving tool post 4 may be detected using an electromagnetic scale or a resolver. In this case, each position detector is not required to be of an absolute type, but of an incremental type. In this case, before machining starts, the machine body 5 is required to be positioned necessarily at the origin position of the machine, which is required to be set to "0" and then machining may start.

The apparatus for controlling the opening and closing of a workpiece clamping mechanism is illustrated and described as being used in the profiler. However the use of the controlling device is not limited to profilers. It may be used in, for example, plano-mirrors and horizontal boring machines.

A specified structure and shape of the embodiment of the apparatus for controlling the opening and closing of a workpiece clamping mechanism according to the present invention may take any other structure and shape as long as the object of the present invention is achieved.

As described above, an apparatus for controlling the opening and closing of the work clamping mechanism in the numerically controlled machine tool greatly reduces a time required for making clamping arrangements. Thereby, the time required to process such objects as an elongated workpiece is reduced when compared to the time it takes conventional apparatus the identical workpiece.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A clamping apparatus comprising:
   (a) a base structure;
   (b) a plurality of clamping mechanisms for clamping a workpiece on said base structure;
   (c) means for opening and closing said plurality of clamping mechanisms;
   (d) an operating element movable along said base structure in a first direction;
   (e) means for detecting a position of said operating element with respect to a predetermined origin position;

(f) means for detecting a moving speed of said operating element with respect to said base structure in said first direction;

(g) each of said plurality of clamping mechanisms being at a predetermined position with respect to said origin and having an unclamped interval extending about said predetermined position along said first direction, said unclamped interval being based on said moving speed of said main shaft and being determined for each of said plurality of clamping mechanisms;

(h) means for inputting said position of said operating element, said moving speed of said operating element, said position of each of said plurality of clamping mechanisms and said unclamped interval for each of said plurality of clamping mechanisms; and (i) means, connected to said inputting means, for controlling the opening and closing of said plurality of clamping mechanisms such that each of said clamping mechanisms is opened when said position of said operating element is within said unclamped interval for each of said clamping mechanisms and is closed when said position of said operating element is outside of said unclamped interval for each of said clamping mechanisms.

2. An apparatus according to claim 1, wherein the controlling means includes a sequencer.

3. An apparatus according to claim 1, wherein the controlling means includes a microcomputer.

4. An apparatus according to claim 1, wherein the position detecting means and the speed detecting means shares a single absolute pulse encoder.

5. An apparatus according to claim 1, wherein in the driving means for the clamping mechanism includes a hydraulic cylinder.

6. An apparatus according to claim 1, wherein the driving means for the clamping mechanism includes an air cylinder.

7. An apparatus according to claim 1, wherein said base structure includes a means for receiving said work piece.

8. An apparatus according to claim 7, wherein each of said plurality of clamping mechanisms includes a clamper pawl.

9. An apparatus according to claim 8, wherein said plurality of clamping mechanisms are disposed in two rows, each row having at least two clamping mechanisms.

10. An apparatus according to claim 1, wherein said unclamped interval is bisected by said position of said clamping mechanism.

11. An apparatus according to claim 10, wherein said base structure includes a means for receiving said work piece.

12. An apparatus according to claim 11, wherein each of said plurality of clamping mechanisms includes a clamper pawl.

13. An apparatus according to claim 12, wherein said plurality of clamping mechanisms are disposed in two rows, each row having at least two clamping mechanisms.

14. An apparatus according to claim 1, wherein said unclamped interval is substantially the same for each of said plurality of clamping mechanisms.

* * * * *